S. T. WILLSON.
COOKING APPLIANCE.
APPLICATION FILED JAN. 3, 1907. RENEWED JAN. 11, 1908.

970,286.

Patented Sept. 13, 1910.

WITNESSES:
J. M. Fowler Jr.
H. S. Hill

INVENTOR.
Samuel T. Willson
BY
Mason, Fenwick & Lawrence
ATTORNEYS

UNITED STATES PATENT OFFICE.

SAMUEL T. WILLSON, OF DENVER, COLORADO.

COOKING APPLIANCE.

970,286. Specification of Letters Patent. Patented Sept. 13, 1910.

Application filed January 3, 1907, Serial No. 350,568. Renewed January 11, 1908. Serial No. 410,446.

*To all whom it may concern:*

Be it known that I, SAMUEL T. WILLSON, a citizen of the United States, residing at Denver, in the county of Denver and State of Colorado, have invented certain new and useful Improvements in Cooking Appliances; and I do hereby declare the following to be a full, clear, and exact description of the invention, such as will enable others skilled in the art to which it appertains to make and use the same.

The present invention relates to improvements in that class of devices which is commonly employed for the toasting of bread, the broiling of meat or similar operations, the object being to provide a structure in which the heat is enabled to operate upon both the upper and lower face of the article at the same time, thereby bringing about a great saving in time and doing away with the necessity of frequently turning the same.

In carrying out the invention a series of burners is mounted within a casing, and a series of shelves is removably mounted therein, in such manner that one shelf is positioned in each space between two burners, so that the burner operates both upon the shelf immediately below it and the shelf above it, a screen being interposed between each of the burners and the shelf above the same in order to more evenly distribute the heat.

With these and other objects in view, the invention comprises certain novel constructions, combinations and arrangements of parts as will be hereinafter more fully described and claimed.

Figure 1:
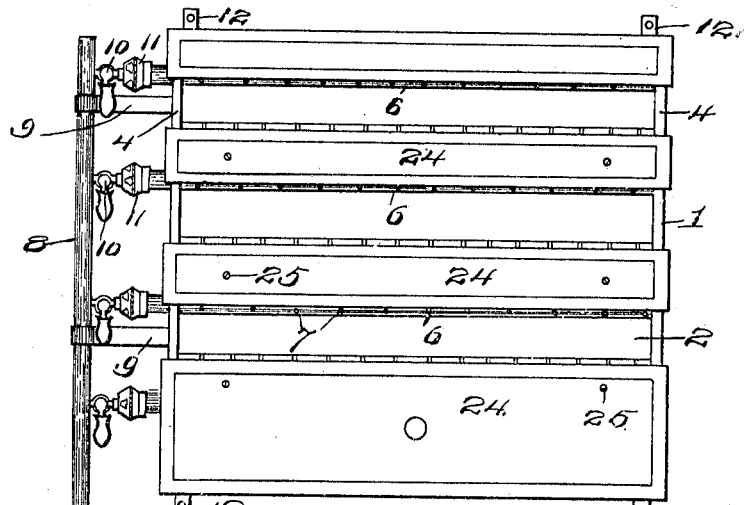
Figures 2, 3, 5:
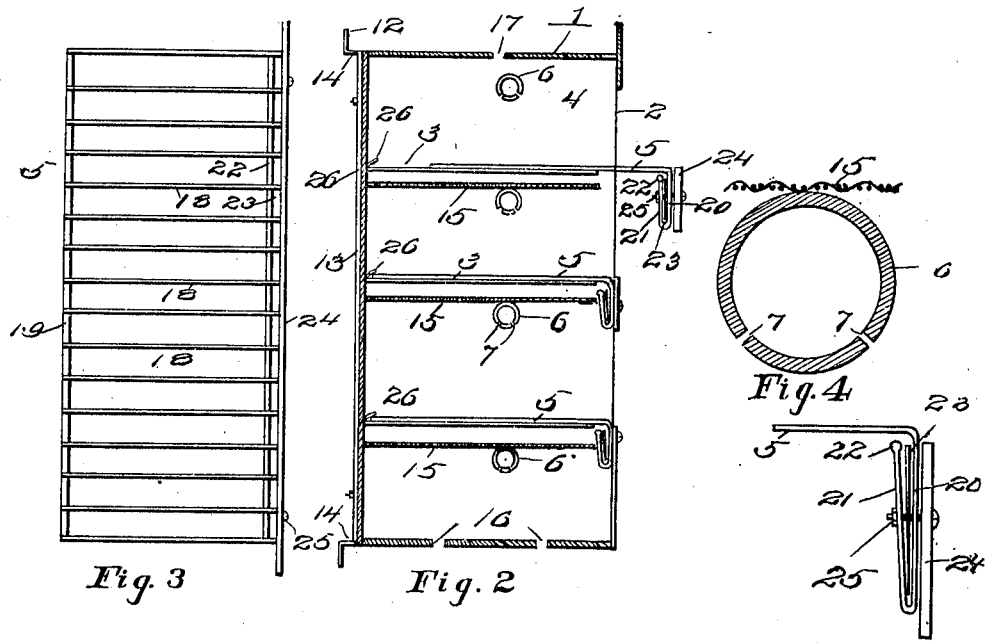

In the accompanying drawings:—Figure 1 is a front elevation of a cooking appliance constructed in accordance with the present invention. Fig. 2 is a transverse, sectional view through the same, one of the shelves being shown as partly withdrawn. Fig. 3 is a top plan view of one of the shelves. Fig. 4 is a transverse, sectional view through one of the burners and a portion of the spreading screen located thereover. Fig. 5 is an enlarged end view of the front portion of one of the shelves.

The numeral 1 designates a casing which is open at one side, as seen at 2, and which is shown as rectangular in shape, although other forms might be employed without departing from the spirit of the invention. A series of ledges 3 are located at corresponding points upon each of the sides 4 of the casing 1, and serve as supports upon which the shelves 5 are removably mounted. A burner 6 connecting the opposite sides 4 of the casing 1 is located above and below each of the shelves 5, and these burners are shown as having a tubular formation, the discharge openings 7 being formed in the lower portions of the burners so that the flame is first directed preferably downwardly toward the shelf below the burner and then rises toward the shelf above the burner. It will also be observed that one of the burners is located above the upper shelf, since as will be readily apparent it is always necessary to employ one more burner than shelf. The supply pipe 8 extends along one side of the casing 1, and is held in position by means of brackets 9 projecting from the said casing. One end of each of the burners 6 projects beyond the side of the casing and communicates with the supply pipe 8, suitable valves 10 and air mixers 11 being provided to control the supply of gas to the said burners. Straps 12 are provided, by means of which the casing can be supported from the wall or other support, the said straps projecting outwardly in order to hold the casing spaced from the support. In the construction shown in the drawings, these straps comprise a pair of vertical bars 13 secured to the back of the casing, the opposite ends of the two bars being provided with off-set portions, as indicated at 14.

Interposed between each of the shelves 5 and the burner 6 located thereunder is a spreading device 15, which preferably is in the nature of a wire screen and serves to distribute the heat so that the same will act more evenly over the entire surface of the shelf. It will be observed that the bottom of the casing 1 is formed with a series of openings 16, while the top of the casing has an opening 17 formed therein, the said openings coöperating with each other to produce an upward circulation of the air through the casing.

The shelves 5, it will be observed, are in the form of grids and comprise a series of transversely disposed wires or supporting bars 18, the said wires having their inner ends connected by the longitudinal bar 19, while their outer ends are bent downwardly, as at 20, and then upwardly, as at 21, the extremities of the upwardly bent portions 21 being connected by the longitudinal member 22. A strip 23 is interposed between the downwardly bent portions 20 and the upwardly bent portions 21, and the downwardly bent portions 20 are clamped between this strip 23 and the shield 24 by means of the bolts 25. When the shelves are in position it will be readily apparent that the shields 24 close or partially close the openings 2 to prevent the escape of the heat therethrough and deflect the heat inwardly so that the same passes through the shelf. A series of spring tongues 26 are formed in connection with the back of the casing 1, and frictionally engage the rear edge of the shelves 5 in order to hold the latter in position.

In the operation of the device it will be readily apparent that the flame from each of the burners 6 first acts upon the shelf 5 below the burner and then rises so as to act upon the shelf immediately above the burner. Where a series of shelves and burners is employed as in the present instance, the articles placed upon the shelves 5 are subjected to the action of the heat from the burners immediately above and below the same, thereby enabling bread to be toasted, or similar operations to be carried on in a much less time than that usually required and without the necessity of turning the same.

Having thus fully described my invention, what I claim as new and desire to secure by Letters Patent is:—

1. In a device of the character described, the combination of a casing, one side of which is open, a series of shelves removably mounted within the casing, a burner located under each of the shelves, and a shield carried by each of the shelves and positioned to close the opening and prevent the escape of the heat.

2. In a device of the character described, the combination of a casing having one side thereof open, a shelf slidably mounted within the casing, a burner mounted so as to operate upon the shelf and a shield carried by and in front of the shelf positioned as a closure and to prevent the escape of the heat.

In testimony whereof I affix my signature in presence of two witnesses.

SAMUEL T. WILLSON.

Witnesses:
CARLE WHITEHEAD,
W. B. SHATTUC.